United States Patent [19]

Orain

[11] Patent Number: 5,525,111
[45] Date of Patent: Jun. 11, 1996

[54] ARTICULATED TRANSMISSION JOINT WITH QUADRUPLE DRIVE LINK

[75] Inventor: Michel Orain, Conflans-Sainte-Honorine, France

[73] Assignee: Glaenzer Spicer, Poissy, France

[21] Appl. No.: 344,531

[22] Filed: Nov. 23, 1994

Related U.S. Application Data

[63] Continuation of Ser. No. 905,247, Jun. 26, 1992, abandoned.

[30] Foreign Application Priority Data

Jun. 28, 1991 [FR] France ................... 91 08048

[51] Int. Cl.$^6$ .............................. F16D 3/20; F16D 3/26
[52] U.S. Cl. ..................... 464/124; 464/109; 464/118; 464/905
[58] Field of Search ....................... 464/109, 111, 464/112, 122, 123, 124, 905

[56] References Cited

U.S. PATENT DOCUMENTS

| | | | |
|---|---|---|---|
| 2,670,614 | 3/1954 | Wildhaber | 464/124 |
| 4,487,594 | 12/1984 | Sindelar | 464/905 X |
| 4,689,035 | 8/1987 | Orain | 464/118 X |

FOREIGN PATENT DOCUMENTS

| | | |
|---|---|---|
| 2566858 | 1/1986 | France . |
| 2174477 | 11/1986 | United Kingdom . |

Primary Examiner—Daniel P. Stodola
Assistant Examiner—Eileen A. Dunn
Attorney, Agent, or Firm—Harness, Dickey & Pierce

[57] ABSTRACT

The four trunnions (11) transmit the rotation of the shaft (8) to the body (1) through the intermediately of four tracks (3) which oscillate by rolling without sliding on the inner wall of the body (1). In addition, each track (3) is coupled angularly with the two adjacent tracks by mating teeth (7) so that any inclination of one track produces a contrary inclination of the two adjacent tracks and consequently an inclination in the same direction of the opposite track. The radii (a, b) according to which the tracks roll against the inner wall of the body and the position of the center of gravity (G) of the tracks are such that the centrifugal force (F) returns the tracks into neutral position. The inherent oscillation frequency of the tracks under the effect of this return is equal to twice the speed of rotation of the joint. This relationship is true for every joint rotation speed because the centrifugal force is proportional to the square of the speed of rotation, and the inherent frequency is proportional to the square root of the return force, therefore proportional to the speed of rotation.

19 Claims, 5 Drawing Sheets

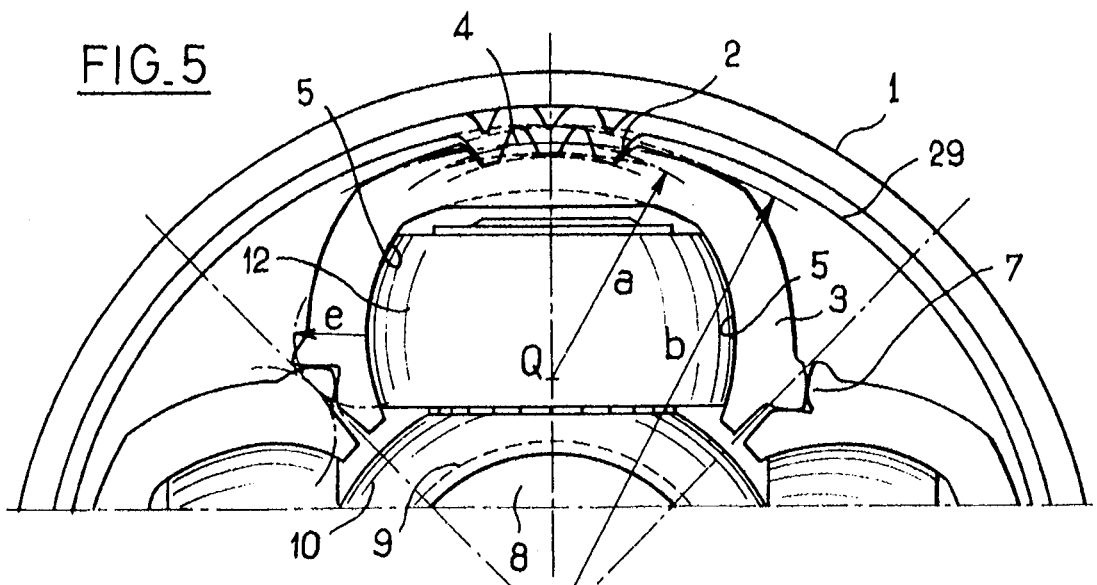
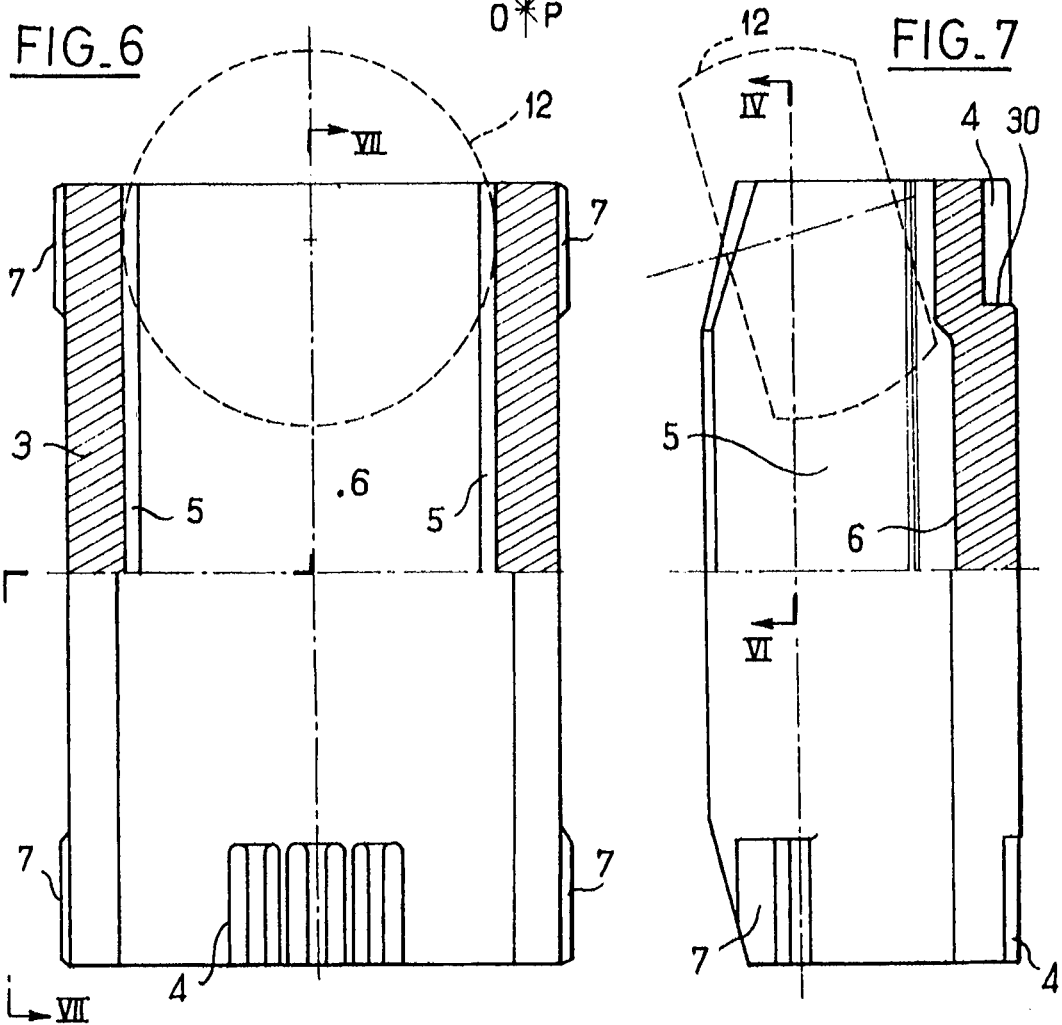

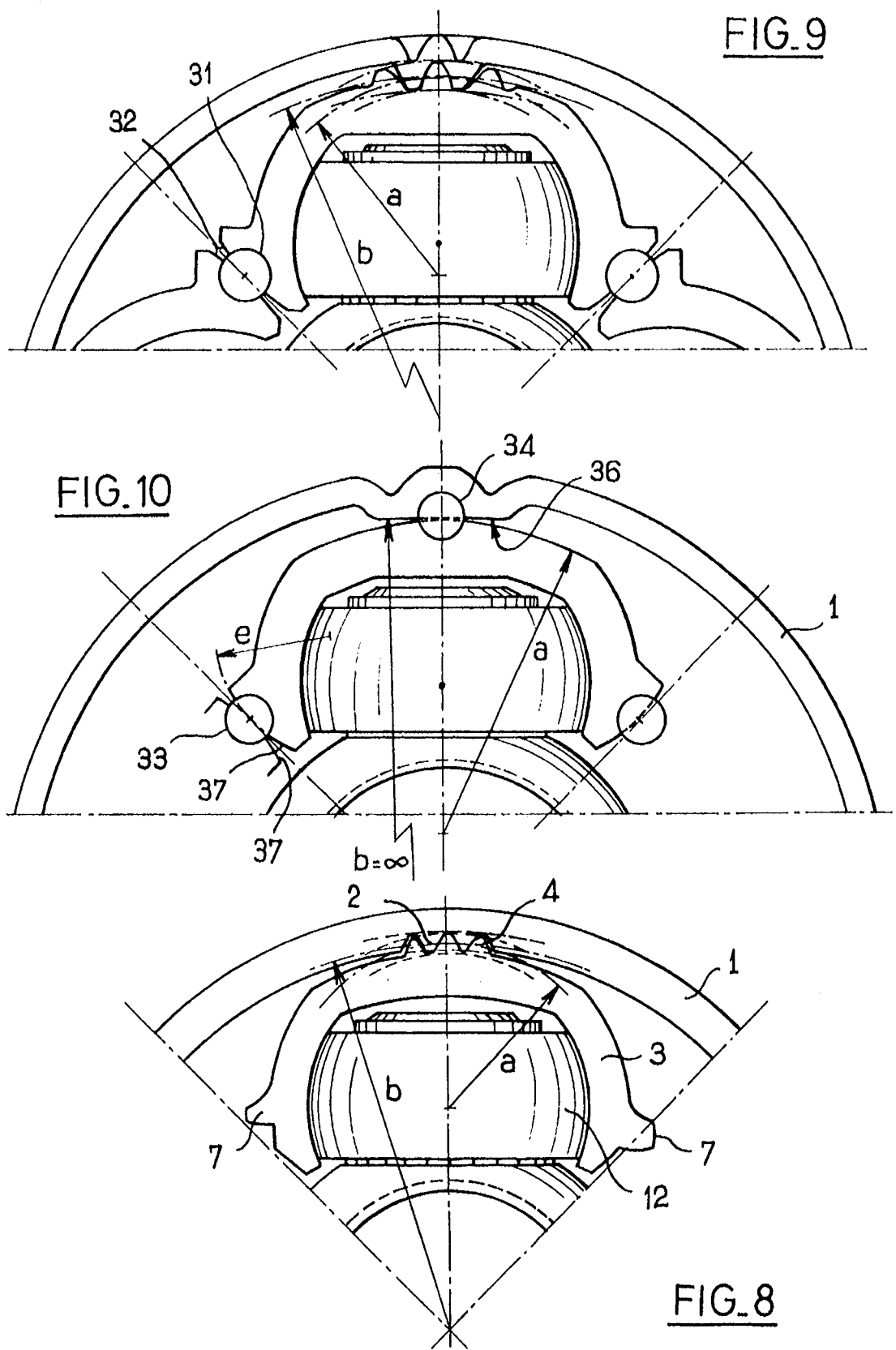

1

ARTICULATED TRANSMISSION JOINT WITH QUADRUPLE DRIVE LINK

This is a continuation of U.S. patent application Ser. No. 905,247, filed Jun. 26, 1992, now abandoned.

BACKGROUND OF THE INVENTION

The present invention relates to an articulated transmission joint with quadruple drive link.

FR-A-2,566,858 discloses such a transmission joint comprising a cross-pin whose four radial arms, connected to one of the sides of the transmission, are engaged in four longitudinal tracks connected to the other side of the transmission.

Such joints are capable of transmitting very high speeds of rotation without significant friction or wear, and without any vibration inherent in the kinematics of the joint being transmitted to the input and output shafts. This is because, on the one hand the joint is homokinetic, and on the other hand it is capable of performing a complete revolution with strict immobility of its geometrical input and output axes, even when they form an angle between them. On the contrary, with an articulated joint having only a triple drive link (joint with tripod and three tracks), at least one of the axes performs a slight planetary movement in the course of a revolution, and this produces vibrations at very high speed.

In order for the four drive links to be capable of coexisting without mechanical tension in the joint, it is necessary for the tracks or the trunnions to be mounted elements which oscillate with respect to the side of the transmission with which they are associated.

In fact, during operation at an angle, when the plane of the axes of the two members of the joint forms an angle with respect to each of the trunnion axes, the centres of the trunnions would no longer be located in the axis of the tracks if it were not possible for the trunnions or the tracks to become slightly offset.

The offset necessary for each track or trunnion is opposed to that which is necessary for its two neighbours. The oscillating elements (tracks or trunnions) are coupled angularly to one another so as to impose this phase opposition between each oscillating element and its two neighbours. In the absence of such a coupling, all of the oscillating elements would roll over in the same direction under the action of the torque to be transmitted.

Thus, there are four oscillating elements and, at any point in time, their movements are equal and opposite, so that the forces of inertia which result from this cancel one another and do not produce any torsional vibration on either side of the transmission. Consequently, despite the oscillation of the oscillating elements, joints with quadruple drive link are very well suited not only to lateral transmission shafts ending at the wheels, but also to very high speeds of rotation, for example 6,000 rpm, which are encountered upstream of the differential particularly in the longitudinal transmission shafts in vehicles with rear wheel drive or with four wheel drive. Moreover, on these joints, the maximum break angles encountered in practice are very small, which limits the amplitude of the oscillations of the oscillating elements and therefore the amplitude of the to-and-fro movement which must be made along each trunnion arm by the spherical roller which is generally provided thereon. This movement is necessary in order for the roller to remain centred on the axis of the corresponding track throughout each revolution of the joint when the joint is operating at an angle.

2

The frequency of oscillation and of the oscillating elements is twice the speed of rotation of the joint. Thus, for a speed of rotation of 100 rps (6,000 rpm), for example, the frequency of oscillation of the oscillating elements is 200 Hertz. Although the amplitude of the oscillation movements is small—a few degrees—, the inertia forces brought into play are, at such frequencies, far from negligible.

U.S. Pat. No. 4,571,214 discloses a pseudo-spherical roller which is specially designed for high-speed homokinetic joints. This pseudo-spherical roller, slideably mounted on an arm of the cross-pin, can contact the edges of its two rolling paths, simultaneously and without damage, during relaxations of the torque or when the torque is reversed, even when the effect of the centrifugal force is greater than that of the torque to be transmitted.

Now, in the joint according to FR-A-2,566,858, it is the force of contact between the tracks and the arms of the cross-pin (that is to say, in the example, between the tracks and the rollers provided on the arms of the cross-pin) which ensures the reciprocating oscillation of the oscillating tracks—or trunnions—by communicating to them the reciprocating forces which are necessary for them to overcome their inertia. The reciprocating forces of inertia to be overcome can be of the same order of magnitude as the centrifugal force applied to the rollers. This centrifugal force is therefore not capable, by itself, of maintaining the roller bearing simultaneously against both rolling paths. This may result in losses of contact and in audible impacts when contact is restored between the rollers and their rolling paths, when the rollers bear alternately on one track and on the other in order to produce the reciprocating oscillation force. This is especially true when the torque transmitted is too weak to favour the bearing against one of the two rolling paths.

SUMMARY OF THE INVENTION

The object of the present invention is to render silent the operation of an articulated transmission joint with quadruple drive link, even under weak load.

According to the invention, the articulated transmission joint with quadruple drive link, comprising a first member with four longitudinal tracks and a second member whose four radial trunnions are each received in a track and may be inclined longitudinally and laterally therein, these two members having respective axes which can be offset angularly with respect to one another, one of the two elements of each "rolling path-trunnion" pair being mounted with respect to the member with which it is associated so as to be capable of oscillating about an axis parallel to the axis of the said associated member and separated radially from a centre of lateral inclination of the trunnion with respect to its track, each oscillating element being coupled angularly to the two adjacent oscillating elements so as to oscillate in phase opposition with respect to them, is characterised in that each oscillating element is mounted so as to be returned into neutral position by the centrifugal force due to the rotation of the joint, and in that the inherent frequency, expressed in cycles per unit time, of oscillation of each oscillating element under the return of the centrifugal force at a given speed is substantially equal to twice this speed expressed as a number of revolutions during the said unit of time.

Preferably, the oscillating elements are tracks which open towards the axis of the member with which they are associated and bear, by means of their radially outer side in oscillating manner, against an inner peripheral wall of the said associated member.

The invention is based on the following finding: the centrifugal force produced by a mass in rotation is proportional to the square of the speed of rotation. Furthermore, the frequency of an oscillatory movement subjected to a return force towards a neutral position is proportional to the square root of the return force. Consequently, if the return force is a centrifugal force, the inherent frequency of the oscillatory movement is proportional to the speed of rotation. Consequently, if the inherent frequency of the oscillating elements is equal to twice the speed of rotation of the joint for one given speed of rotation, this relationship will be true for all speeds of rotation of the joint. In other words, at all speeds of rotation of the joint, the frequency of oscillation imposed on the oscillating elements by the kinematics of the joint corresponds to their inherent frequency of oscillation, so that the cyclic force to be applied to the oscillating elements in order to maintain their oscillating movement is only a very weak force for compensation of possible residual friction in the oscillating assembly of the oscillating elements.

Thus, the invention proposes a special arrangement which cancels, virtually entirely, the reciprocating force to be supplied from the outside to the oscillating elements in order to maintain their oscillation, which renders impossible any cyclic loss of contact between the radial arms and the tracks, and therefore ensures the silent operation of the joint.

Moreover, since the four driving elements or rollers are disposed symmetrically in pairs around the shaft, the slight residual rolling friction in the tracks are very precisely compensated axially in pairs. As a result of this, the joint is entirely neutral axially, since no axial reaction can be passed onto the shaft when the joint is operating at an angle and under torque. This major advantage permits the use of this joint in the lateral transmissions of front wheel drive vehicles requiring a high level of comfort.

Moreover, the arrangement according to the invention requires no gadgetry or additional part. It therefore involves practically no additional production cost.

According to a preferred feature of the invention, the arrangement is such that the moment of return of the oscillating elements towards the neutral position is proportional to their instantaneous angle of oscillation. In this manner, the cancellation of the reciprocating force to be supplied to the oscillating elements is ensured whatever the working angle of the joint. In fact, the amplitude of oscillation of the oscillating elements is variable, and, more precisely, increases substantially with the square of the working angle of the joint. Since there is proportionality between instantaneous angle of oscillation and return moment, however, the inherent frequency remains independent of the amplitude of oscillation, in accordance with the law of isochronous movements, and therefore independent of the working angle of the joint.

Further features and advantages of the invention will become apparent from the following description relating to non-limiting examples.

BRIEF DESCRIPTION OF THE DRAWINGS

In the accompanying drawings:

FIG. 5 is a partial view in cross-section of one specific embodiment of the joint of FIGS. 1 to 4;

FIG. 6 is a plan view of a track of FIG. 5, with half-section along the plane VI—VI of FIG. 7;

FIG. 7 is a view along line VII—VII of FIG. 6;

FIGS. 8 to 10 are partial end views of three other specific embodiments of the transmission joint according to the invention;

DETAILED DESCRIPTION OF THE PREFERRED EMBODIMENTS

Figure 1:
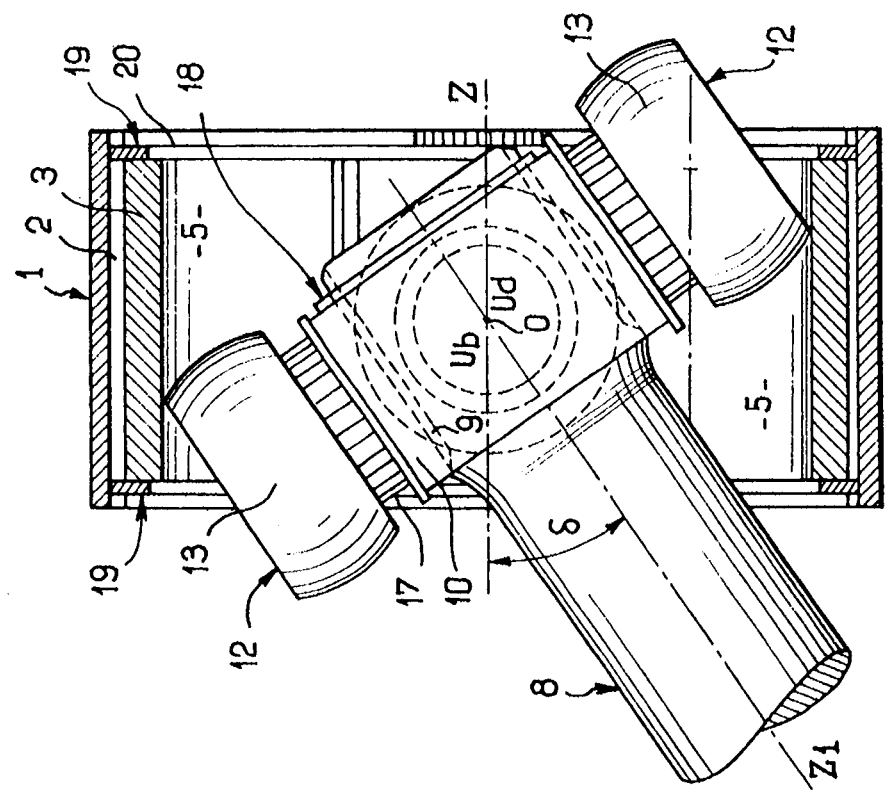
FIG. 1 is an end view, with partial cross-section, of a homokinetic joint according to the invention, in aligned position.

The homokinetic joint shown in FIGS. 1 to 4 comprises a first member or outer member constituted by a cylindrical body 1 which can be fixed for example by means of a flange and bolts, or by any other known means, onto one of the mechanical members to be joined. This body comprises, on its inner surface, four flat zones or slightly curved zones, forming oscillation cradles 2 in which longitudinal grooves are arranged. These cradles extend over segments of about 30° each.

Four trough-shaped tracks 3 have, on the radially outer surface of their arch, a rolling surface 4 by means of which they bear in oscillating manner on the oscillation cradles of the body. The internal grooves of the body mesh with longitudinal grooves of the same modulus machined on the rolling surface 4. The mean outer radius of this rolling surface 4 is smaller than that of the grooved cradles 2 of the body, so as to permit the tracks to oscillate by rolling without sliding inside the body.

The cross-section of these tracks comprises internally two concentric circular segments 5, centred at a point Ua, Ub, Uc or Ud respectively and located facing each other, these two segments being connected by an internal arch 6 which may, moreover, ensure a cylindrical continuity between the two segments.

The two edges of the tracks bear grooves 7 machined on cylindrical surfaces, the axis of which corresponds approximately to the middle groove of the rolling surface 4 of these tracks. Thus, when they are in place inside the body, the four tracks can oscillate without play and without hard points by rolling of the teeth or grooves with involute-shaped sides 2, 4 and 7 in contact with one another, in the manner of satellite gears meshed inside a wheel with internal teeth, with the special feature that, taking into account the angular coupling by the teeth 7, each track oscillates in phase opposition with respect to its two neighbours, as will be seen in greater detail herein below.

The joint also comprises a shaft 8, welded or fixed by means of grooves 9 to a cross-pin 10, constituting the second member of the joint, and held axially by a retaining ring 18. This cross-pin comprises four trunnions 11 orientated along two perpendicular and coplanar axes and on which are mounted rollers 12 having spherical outer surfaces 13. These rollers are slideably and rotatably mounted on the trunnions, either by direct contact between their bore 14 and the trunnion, or with interposition of needles 15 held axially by a device having a retaining ring 16 and saddle washer 17, known per se.

Figure 2:
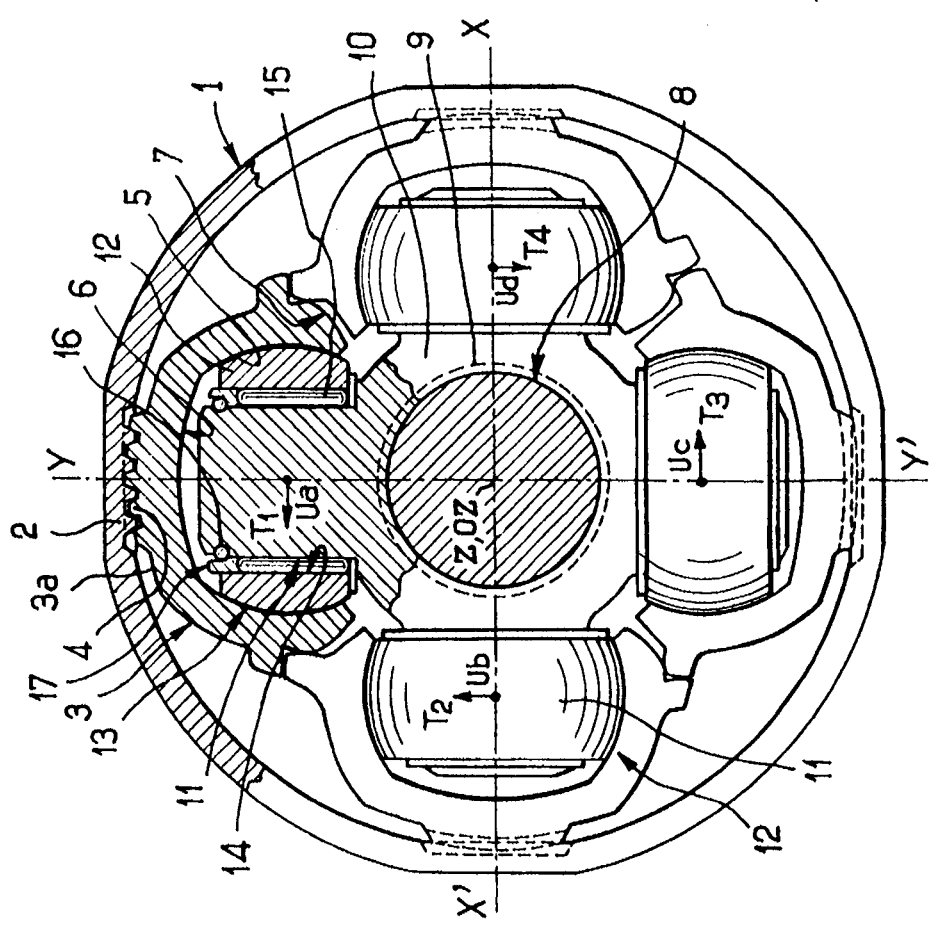
FIG. 2 is an elevation of the same joint in broken position, at an angle of about 35° situated in the plane of the axis of two opposed trunnions, the member with tracks being seen in cross-section in this plane.
Figure 4:
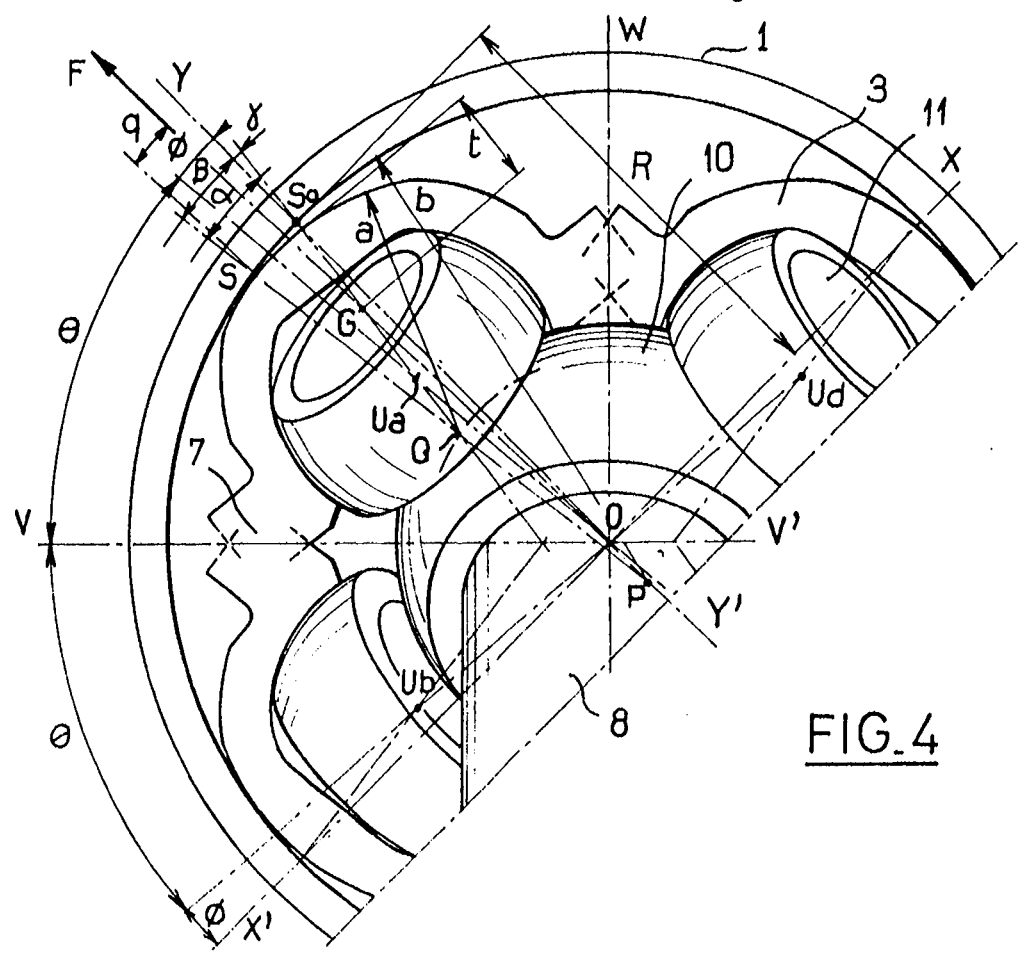
FIG. 4 is a view similar to FIG. 3 but after a slight revolution, so that the break angle is now situated outside the planes of the axes of the opposed tracks.

These rollers, having a curvature similar to those of the rolling paths 5 of the tracks which constitute the rolling paths, can move freely inside these tracks. They roll on the rolling paths 5 which are surface-hardened so as to be able to withstand heavy loads without deformation or wear. The tracks 3 are for example held axially by resilient retaining rings 19 housed in grooves 20 machined at the ends of the body 1. The spherical shape of the rollers additionally permits the trunnions 11 to be inclined longitudinally in the tracks, as shown in FIG. 2, when the joint is operating at an angle, and also to be inclined laterally therein, as shown in FIG. 4, when the tracks are themselves separated from their neutral position of oscillation, as will be seen later in greater detail.

The basic operation of this first embodiment of a joint according to the invention is as follows, it being noted that, in FIGS. 3 and 4, the grooves between tracks and body and between the tracks themselves have been omitted in order to simplify the diagrams.

Firstly, as far as the kinematics of the tracks 3 are concerned, it may be seen that when the track centred at $U_a$ turns clockwise, the tracks centred at $U_b$ and $U_d$ turn anti-clockwise, and consequently, the track centred at $U_c$ (not shown in FIG. 4) turns clockwise. The point of contact between the surfaces 2 and 4, which constitutes the instantaneous centre of rotation of the tracks relative to the body and which is termed S in FIG. 4 and $S_o$ in the specific case of the neutral position shown in FIG. 3, moves on either side of the middle groove (point $S_o$) of the surfaces 2. As a result of this, $U_a$ and $U_b$, on the one hand, and $U_c$ and $U_d$, on the other hand, approach one another whereas, moreover, $U_a$ and $U_d$, on the one hand, and $U_b$ and $U_c$, on the other hand, move apart. If the direction of rotation of one of the tracks is reversed, all of the rotations and all of the relative displacements are also reversed. The displacements of the points $U_a$ to $U_d$ shown by the arrows $T_1$ to $T_4$ are equal in absolute value, directed circumferentially, and in alternate directions. As a result of this, according to one of the features of this application, the straight lines $U_aU_c$, on the one hand, and $U_bU_d$, on the other hand, pass, at all points in time, through the centre P of the body. From this it can be deduced, according to a second feature, that the rotation of $U_aU_c$ is equal and in the opposite direction to the rotation of $U_bU_d$.

When a torque C is applied to the shaft 8 and therefore to the cross-pin 10, the tracks 3 cannot roll over relative to the body under the effect of this torque, because their tendencies towards such a movement are counteracted by the set of mating teeth 7 which prevents any inclination of the tracks in the same direction under the action of the torque. On the contrary, the forces applied to the rollers are equal and all of the tracks transmit an equal share of the torque, i.e. C/4 each. This is true even in spite of a lack of circular division either of the cross-pin or of the internal cradles 2 of the body. In other words, the cross-pin/tracks link is isostatic.

Figure 3:
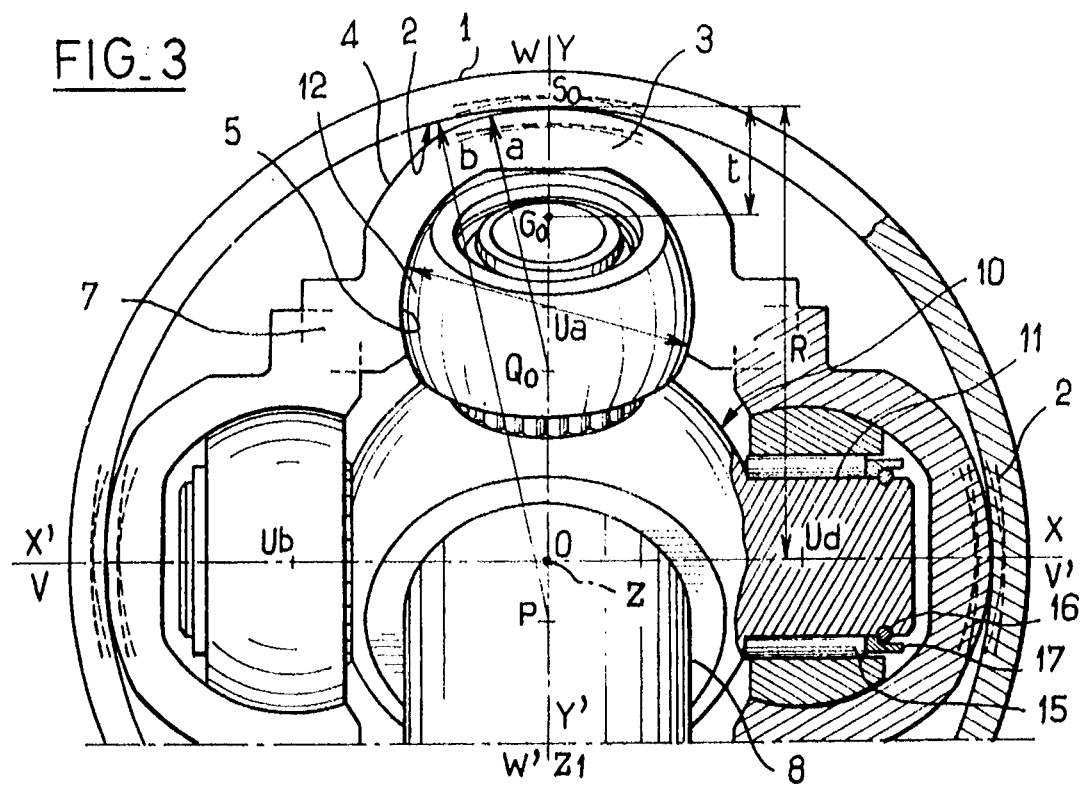
FIG. 3 is a partial front view of the joint of FIG. 2, with partial cross-section.

The setting of the shaft at an angle δ does not cause any deviation of the tracks from their neutral oscillation position when the angular position of the body 1 about its axis is such that the break angle δ is in the same plane as two of the trunnion axes (FIG. 3).

FIG. 4 shows the same joint seen along the axis of the body after a slight revolution of the body 1 and of the shaft 8 about their respective axes with conservation of the break angle δ, so that the axes $U_aU_c$ and $U_bU_d$ of the cross-pin now form an angle of 45° with the geometrical break axis VV'. These axes $U_a U_c$ and $U_bU_d$, set by construction at 90°—therefore at full scale—form with VV', in this view, an angle θ less than 45°. In order to accommodate this displacement, the tracks have oscillated by an angle γ relative to the body 1 and symmetrically in relation to the axis VV' as they are compelled to do by the set of teeth 2, 4 and 7. As a result of this, the axis VV', bisector of the trunnions of the cross-pin, is also bisector of the axes XX' and YY', which are at right angles to each other, of the body 1. In other words, the break about a bisector axis of the trunnions does not produce any rotation of the shaft 8 relative to the body 1, which shows that the joint is homokinetic.

Therefore, the plane containing the axis OZ of the body 1 and the axis $OZ_1$ of the shaft, or break plane, the outline of which is represented by the line OW, is set here, at a phase angle of 45° relative to the axis OY of the body passing through the position $S_o$ of the contact between the body and the track of centre $U_a$ when it is in neutral oscillation position.

For this phase angle of 45°, the trunnion axis $OU_a$ has a maximum angular offset φ with OY and forms an angle θ with the bisector plane OV such that:

$$\tan \theta = \cos \delta$$

where $\theta = \pi/2 - \phi$.

For the example corresponding to FIG. 4, we would have:

$$\phi = 4°, 10.$$

Note that φ would represent, in a conventional cardan joint, the lack of homokineticity inherent in this articulation.

It is found that an oscillation of a quarter of a period corresponds to a variation in the phase angle from 0° to 45°, i.e. ⅛ of a revolution, in other words the frequency of oscillation of the tracks is equal to twice the speed of rotation of the joint.

Observation: The working angle δ=30° has been chosen so that the angular offset θ and the angle of oscillation of the tracks are relatively large and easy to distinguish in FIGS. 3 and 4.

For a working angle δ=15° corresponding to a maximum which is practical in high-speed applications, the angular offset θ and the angle of oscillation γ would be four times smaller.

According to the invention, the radii of curvature a and b (FIG. 4) of the rolling surfaces 4 and cradles 3 respectively are such, with respect to the position of the centre of gravity G of the mass subject to centrifugal force with each track (this is essentially the total mass of the track and of the roller since the centre of the roller is obliged to remain on the geometrical axis of the track), that the centrifugal force F created by this mass because of the rotation of the shaft 8 and of the body 1 about their axes $OZ_1$ and OZ constitutes a force returning the track towards its neutral position (position of zero inclination).

To this end, the values of a and b have to be determined so that, for each inclination of the track, the displacement from the position $S_o$ (FIG. 3) to a position such as S (FIG. 4) of the point of contact between the rolling surface 4 and its cradle 2 must be sufficient for the line of action OG of the centrifugal force to pass between the positions $S_o$ and S, and not beyond the point S with respect to the position $S_o$, although the centre of gravity G (FIG. 4) is itself displaced towards the line OS with respect to its initial position $G_o$ (FIG. 3).

It can be seen that if the example shown is changed so that a=0, that is to say so that each track is articulated with the body 1, the above-mentioned condition could not be met. On the contrary, the centrifugal force would tend to increase any inclination of the tracks.

Furthermore, the oscillation cradle 2 machined on the inside of the body 1 and the rolling surface 4 of the track are profiled in such a manner, in particular their radii b and a are such, that the inherent frequency of oscillation of the track under the return effect due to the centrifugal force, frequency expressed in cycles per unit time, is equal to twice the speed of rotation of the joint, expressed as a number of revolutions per same unit of time.

More specifically, in the case shown in FIG. 4, the plane of symmetry QUa of the track 3 is inclined at an angle γ so as to contain the centre $U_a$ common to the spherical roller and to the circular paths of the track.

The instantaneous centre of oscillation of the track passes from $S_o$ (FIG. 3) to S (FIG. 4) on the extension of the line of the centres PQ at a distance q from the line of action of the centrifugal force F passing through the centre O of the joint and through the centre of gravity G of the track. It is clear that the moment: Fxq of the centrifugal force F relative to the centre of oscillation S tends to return the track into neutral position.

Moreover, according to the invention, for the small amplitudes in question, it is arranged for the moment Fxq to increase linearly with the angle γ of inclination of the track. Thus, the natural frequency of oscillation of the track is independent of the amplitude of the oscillation, and therefore of the working angle δ of the joint.

Moreover, it is known that, in such a system, the natural frequency of oscillation, whatever the amplitude of oscillation (taking the preceding paragraph into account) increases with the square root of the return moment Fxq. Now, since the centrifugal force F is itself proportional to the square of the speed of rotation, it follows that the natural frequency of oscillation increases precisely with the speed of rotation of the joint.

It is therefore sufficient, according to the present invention, to determine the radii of oscillating rolling a and b of the track and of the barrel in terms of the mass of the track and of its inertia relative to the axis of oscillation, so as to establish a natural frequency of oscillation which will always remain equal to twice the speed of rotation of the joint. The inertia of the track may be considered to be independent of the position of S for the small amplitudes in question. Moreover, according to the present invention, the radii of oscillating rolling a and b are rendered compatible with the type of articulated link chosen for the connecting the tracks.

Thus, according to the present invention, the oscillation of the tracks at a frequency of twice the speed of rotation which renders the joint homokinetic, is produced without borrowing any reciprocating motive force from the rollers and therefore without the possibility of periodic loss of contact between the rollers and the paths of the tracks.

Theoretical Résumé

Dynamic return torque exerted on the track during the rotation of the joint at the angular speed ω:

$$Fq = K\gamma M\omega^2 \quad (1)$$

It can be seen that this return torque is proportional:

to the inclination γ of the track to the total mass M of the track and of the roller to the square of the angular speed ω of rotation of the joint to a geometrical coefficient k dependent on the radii of rolling a and b and on the position of the centre of gravity G defined by R and by t (FIG. 3).

For small oscillations, the only ones considered here, we find:

$$k = \frac{ab}{b-a}(R-t) - Rt \quad (2)$$

The inertia of the track relative to the centre of oscillation is: $I_o = m\rho^2$ where m is the mass of the track and ρ is the mean radius of gyration.

The natural frequency of oscillation is:

$$f = \frac{\omega}{2\pi\rho}\sqrt{\frac{kM}{m}} \quad (3)$$

Now, an inherent frequency f is imposed equal to twice the speed of rotation N of the joint in revolutions per second (where:

$$N = \frac{\omega}{2\pi} \text{ )}.$$

Therefore we write:

$$2N = \frac{N}{\rho}\sqrt{\frac{kM}{m}} \quad (4)$$

Taking equation (2) into account, this means imposing:

$$k = 4\rho^2 \frac{m}{M} = \frac{ab}{b-a}(R-t) - Rt = p(R-t) - Rt \quad (5)$$

$$\text{where: } \frac{ab}{b-a} = p \text{ or } \frac{1}{p} = \frac{1}{a} + \frac{1}{b} \quad (6)$$

Using (5):

$$p = \left(4\rho^2 \frac{m}{M} + Rt\right)\frac{1}{R-t} \quad (7)$$

"p": eqivalent radius imposed, which the rolling surface 4 of the track would have if it were oscillating on a flat cradle.

Moreover, the kinematic study shows that the pitch circle radius "e" of the gearing between tracks is also a simple function of "p".

We find:

$$e = \frac{1}{\sqrt{2}}(R-p) = \frac{1}{\sqrt{2}}\left[R - \left(4\rho^2 \frac{m}{M} + Rt\right)\frac{1}{R-t}\right] \quad (8)$$

For: e>0, the pitch circle radius of the gearing between tracks is convex e=0, the gearing is a point (axis of articulation)

e<0, the pitch circle radius is concave.

This equation (8) therefore defines the mode and the dimensions of the possible articulated link between contiguous tracks 3, in terms of the profile of their cross-section, and fixes the proportions to be satisfied in order to obtain the desired result which is the subject of this patent application.

In the example shown in FIGS. 5 to 7, the dorsal teeth 4 of pitch circle radius a and lateral teeth 7 of pitch circle radius e having involute-shaped profiles are cold-formed from a sheet metal blank folded into a U. The teeth occupy only part of the length at each of the ends of the track as shown in FIGS. 6 and 7. Over the rest of the length there may be rolling between free surfaces or, on the contrary, slight clearance.

The internal teeth 2 of the body 1 are formed on the inside of a circular strip 29, which is secured to the wall of the body 1 only after insertion of the tracks, in order for insertion of the tracks to be possible.

The ends 30 of the teeth 4 of the track serve to retain the track axially by contact with the edge of the toothed circular strip 29.

FIG. 8 shows a version in which the track bears dorsal teeth 4 and lateral teeth 7 similar to those of FIG. 5. Here, however, the track 3 is advantageously constructed from a strip rolled directly to the desired final profile, including the teeth. It is sufficient to cut it off to the required length and to treat it so as to obtain the finished tracks.

In this case, the teeth occupy the entire length of the track. The toothed cradles 2 of the body may be either cold-rolled or broached.

FIG. 9 shows a version in which the dorsal teeth 4 of the track 3 are cold-formed or machined.

The internal teeth 2 of the body 1 are cold-formed.

The link between tracks is provided by cylindrical axles or rollers 31, of axis parallel to the axis of the body 1, which correspond, from the kinematic point of view, to an articulation or else to teeth having a pitch circle radius c of zero value. Each roller 31 is engaged in two semi-cylindrical cavities, forming bearing surfaces, each belonging to one of the tracks 3. Clearances 32 located on either side of the bearing surfaces of the rollers permit the relative articulation of the contiguous tracks.

FIG. 10 shows a version in which the link between tracks is provided by rollers 33 in a manner similar to that of FIG. 9. These rollers occupy only part of the length of the tracks which bear and roll against one another by means of cylindrical surfaces 37 of radius c. The rollers 33 therefore form a key preventing the surfaces 37 from slipping over one another. Each roller 33 occupies two semi-cylindrical cavities each formed in one of the cylindrical surfaces of radius c.

The dorsal link of the track with the barrel is provided by cylindrical rollers 34 which transfer the useful force to the body 1.

Apart from these rollers, the rolling surface 4 of the track has a rolling radius a bearing against the cradle 2 of the body constituted by an inner surface which is flat, therefore of radius b of infinite value. The rollers 34, forming keys, occupy two semi-cylindrical cavities made respectively in the rolling surface 4 and in the cradle 2.

Figure 12:
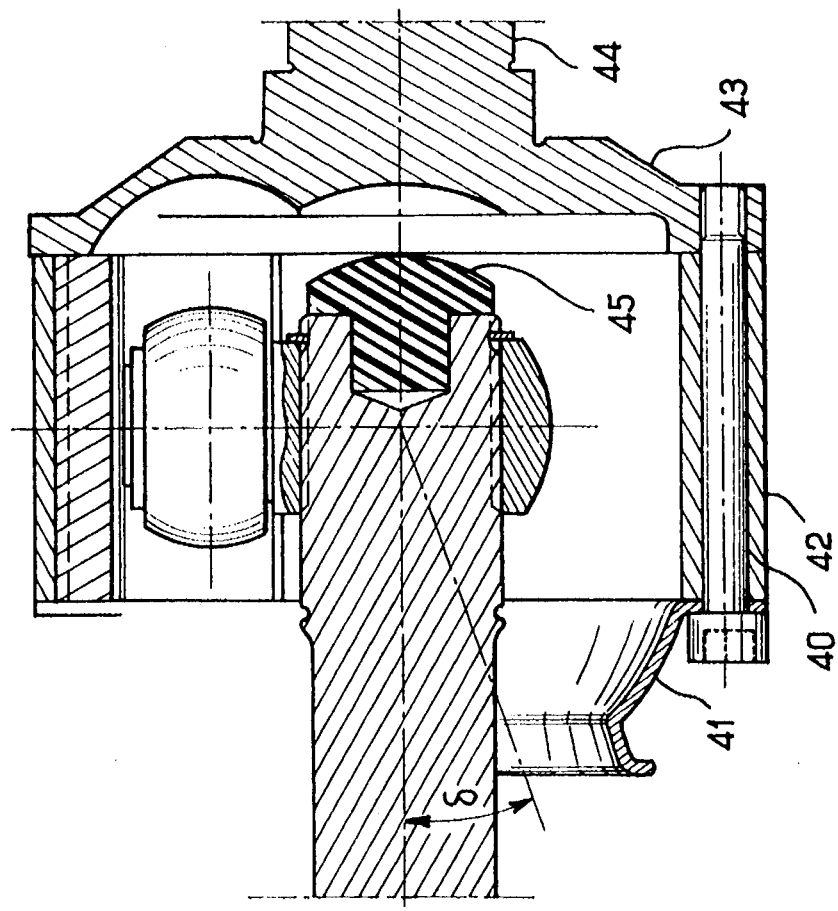
FIG. 12 is a view in cross-section along plane XII—XII of FIG. 11.
Figure 11:
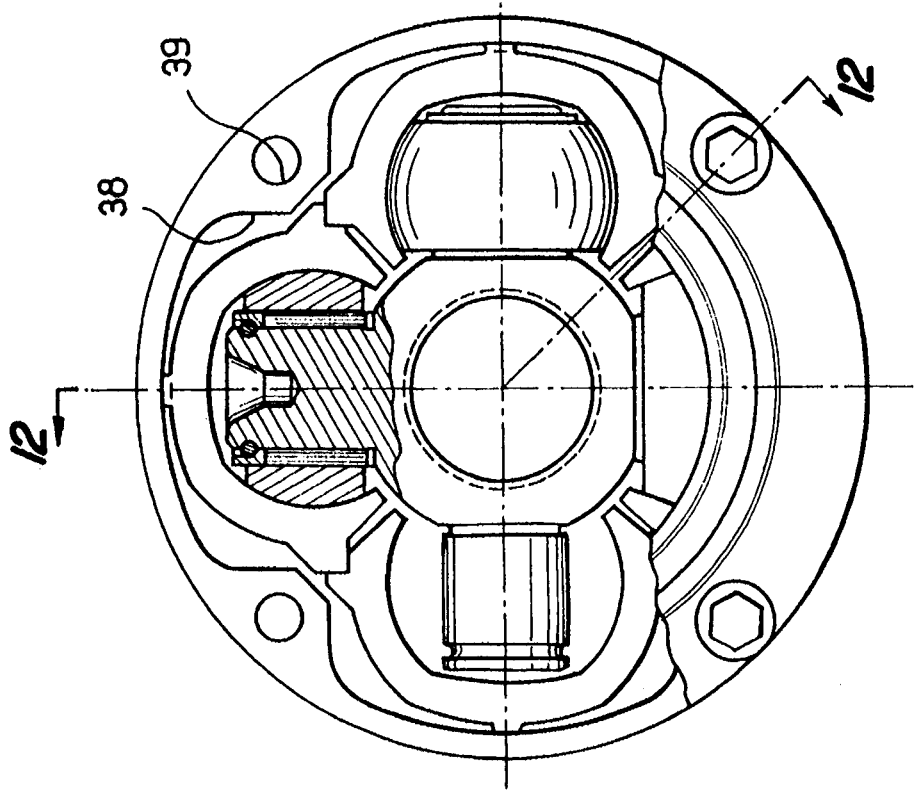
FIG. 11 is an end view, with partial cross-section, cutaway and omission of one roller, of yet another embodiment of the invention.

FIGS. 11 and 12 show a version which can be used for high-speed transmissions or for front wheel drive lateral transmissions and for a maximum break angle δ of 20°. The barrel bears internal swellings 38 using the space left free between the tracks. These swellings are pierced by longitudinal holes 39 allowing the passage of screws 40 for securing a cover 41 and the body 42 onto a flange 43 integral with the drive shaft 44. A knob of plastic material 45 fitted into the free end of the shaft bearing the cross-pin ensures the damped limitation of the sliding travel of the joint by stopping against the back of the flange.

These embodiment examples are not limiting and other versions may be established which would meet the appropriate conditions in order to ensure, according to the present invention, the equality of the natural dynamic frequency of oscillation of the tracks and of the frequency of oscillation imposed by the kinematics of this homokinetic joint.

The radius of the link between tracks may be negative. The radius b of the cradles of the body may be negative, that is to say that these cradles may be convex, in which case the radius a of the rolling surface 4 of the tracks may be infinite (flat surfaces).

The invention is applicable to a non-sliding joint, whose centre O is fixed, for example in accordance with the basic structure shown in FIG. 5 of FR-A-2,566,858.

A joint may be envisaged whose tracks are open radially outwards, and whose radial arms are borne by the inner surface of the body with capability of oscillation.

The grooves may be helicoidal.

I claim:

1. Articulated transmission joint with quadruple drive link, comprising:

a first assembly comprising a first member and four oscillating members, each said oscillating member defining a respective inner longitudinal track and comprising a respective outer first rolling surface having a first radius and said first member comprising four inner second rolling surfaces having a second radius, each of said first rolling surfaces rolling on a respective one of said second rolling surfaces; and a second assembly having four radial trunnions each respectively received in one of said tracks and which may be inclined longitudinally and laterally therein, said first and second assemblies having respective axes which can be offset angularly with respect to one another;

each oscillating member being coupled angularly to two adjacent oscillating members so as to oscillate in phase opposition with respect to said two adjacent oscillating members;

said first and second radii being selected so that each oscillating member is mounted so as to be returned towards a neutral position by a centrifugal force due to rotation of the joint, and so that an inherent frequency, expressed in cycles per unit time, of oscillation of each oscillating member under the return of the centrifugal force at a given speed is substantially equal to twice said given speed expressed as a number of revolutions during the said unit of time.

2. The joint according to claim 1, wherein the moment of return of the oscillating members under the action of the centrifugal force is substantially proportional to their instantaneous angle of oscillation.

3. The transmission joint according to claim 1, wherein a link is defined between each oscillating member and the first member for rolling without sliding between a surface of the oscillating member having a first curvature and a surface borne by the first member having a second curvature, said first and second curvature being different, said link defining a contact region between said oscillating member and said first member, said contact region having a center, and the following equation being satisfied for each oscillating member:

$$\frac{ab}{b-a} = (4\rho^2 m/M + Rt)\frac{1}{R-t}$$

where a = radius of curvature of said outer first rolling surface b = radius of curvature of said inner second rolling surface ρ = mean radius of gyration of the center of gravity of the oscillating member m = mass of the oscillating member M = total mass creating the centrifugal force for return of the oscillating member into neutral position R = distance between said center of said contact region and the axis of the member associated with the oscillating member t=distance between said center of said contact region and the center of gravity of the oscillating member.

4. The joint according to claim 3, wherein each oscillating member further substantially satisfies the following equation:

$$e = \frac{1}{\sqrt{2}} \left[ R - (4\rho^2 m/M + Rt) \frac{1}{R-t} \right]$$

with the following table of interpretation:
- $e \neq 0$: e represents the radius of curvature of surfaces for rolling without sliding by means of which the oscillating members are coupled angularly to one another, and the surfaces for rolling are convex if $e > 0$ and concave if $e < 0$
- $e = 0$: each oscillating member is articulated with the two neighboring oscillating members.

5. Articulated transmission joint with quadruple drive link, comprising:
- a first assembly comprising an outer member and four oscillating members, each said oscillating member defining a respective inner longitudinal track and comprising a respective outer first rolling surface having a first radius and said outer member comprising four inner second rolling surfaces having a second radius, each of said first rolling surfaces rolling on a respective one of said second rolling surfaces; and
- a second assembly having four radial trunnions each respectively received in one of said tracks and which may be displaced longitudinally therein and inclined longitudinally and laterally therein, said first and second assemblies having respective axes which can be offset angularly with respect to one another, each of said tracks opening towards each of said respective axes of said first and second assemblies;
- each oscillating member being coupled angularly to two adjacent oscillating members so as to oscillate in phase opposition with respect to said two adjacent oscillating members;
- said first and second radii being selected so that each oscillating member is mounted so as to be returned towards a neutral position by a centrifugal force due to rotation of the joint, and so that an inherent frequency, expressed in cycles per unit time, of oscillation of each oscillating member under the return of the centrifugal force at a given speed is substantially equal to twice said given speed expressed as a number of revolutions during the said unit of time.

6. The joint according to claim 5, wherein the radially outer first rolling surface of the oscillating members and the inner second rolling surfaces include teeth interengaged by the oscillating member bearing of the tracks, characterised in that the teeth are adjacent to the two axial ends of the oscillating members and separated by smooth surfaces between the oscillating members.

7. The joint according to claim 6, wherein the smooth surfaces are surfaces for rolling without sliding.

8. The joint according to claim 6 further including a ring disposed between said outer member and said oscillating members, said ring having outer teeth disposed adjacent teeth of said outer member and inner teeth disposed adjacent said teeth of said oscillating members, said ring forming a ring for the axial locking of the oscillating members.

9. The joint according to claim 6 wherein the oscillating members are of a sheet metal, folded into a U in which the teeth of the oscillating members are coldformed.

10. The joint according to claim 9, wherein said teeth extend over the entire axial length of the oscillating members, said oscillating members defining sections of a strip rolled to the desired profile, including the teeth.

11. The joint according to claim 5, wherein the radially outer first rolling surface of the oscillating members and the inner second rolling surfaces including surfaces for rolling without sliding of the oscillating members, and for each oscillating member a key, which is partly preferably cylindrical, is housed partly in a cavity of the first outer rolling surface of the oscillating member and in a cavity of the rolling surface of the inner second rolling surface.

12. The joint according to claim 5 wherein the oscillating members are coupled angularly to one another by rolling without mutual sliding of coupling surfaces, for each pair of coupling surfaces, a key which is preferably cylindrical, is housed in the two facing cavities each belonging to one of the coupling surfaces of the pair of coupling surfaces.

13. The joint according to claim 5, wherein the oscillating members are connected to one another by articulations along axes parallel to the axis of the outer member with which the oscillating members are associated.

14. The joint according to claim 13, wherein each articulation is produced by a cylindrical key housed in two facing cavities each belonging to one of the oscillating members associated with the articulation in question.

15. The transmission joint according to claim 5, wherein the first assembly includes a body surrounding the oscillating members and, between the oscillating members, internal swellings through which bores pass in which screws are engaged for securing the body to a flange.

16. The transmission joint according to claim 5, wherein a link is defined between each oscillating member and the inner second rolling surface for rolling without sliding between a surface of the oscillating member having a first curvature and a surface having a second curvature, said first and second curvatures being different, said link defining a contact region between said oscillating member and said inner second rolling surface, said contact region having a center, borne by the inner second rolling surface and the following equation being satisfied for each oscillating member:

$$\frac{ab}{b-a} = (4\rho^2 m/M + Rt) \frac{1}{R-t}$$

where
- a=radius of curvature of said outer first surface
- b=radius of curvature of said inner second rolling surface
- $\rho$=mean radius of gyration of the center of gravity of the oscillating member
- m=mass of the oscillating member
- M=total mass creating the centrifugal force for return of the oscillating member into neutral position
- R=distance between said center of said contact region and the axis of the member associated with the oscillating member
- t=distance between said center of said contact region and the center of gravity of the oscillating member.

17. The joint according to claim 16, wherein each oscillating member further substantially satisfies the following equation:

$$e = \frac{1}{\sqrt{2}} \left[ R - (4\rho^2 m/M + Rt) \frac{1}{R-t} \right]$$

with the following table of interpretation;

c≠0: c represents the radius of curvature of surfaces for rolling without sliding by means of which the oscillating members are coupled angularly to one another, and the surfaces for rolling are convex if c>0 and concave if c<0 c=0: each oscillating member is articulated with the two neighboring oscillating members.

18. The joint according to claim 5, wherein the moment of return of the oscillating members under the action of the centrifugal force is substantially proportional to their instantaneous angle of oscillation.

19. Articulated transmission joint with quadruple drive link, comprising:

a first assembly comprising an outer member and four oscillating members, each said oscillating member defining a respective inner longitudinal track and comprising a respective outer first rolling surface having a first radius and said outer member comprising four inner second rolling surfaces having a second radius, each of said first rolling surfaces rolling on a respective one of said second rolling surfaces; and a second assembly having four radial trunnions each respectively received in one of said tracks and which may be displaced longitudinally therein and inclined longitudinally and laterally therein, said first and second assemblies having respective axes which can be offset angularly with respect to one another, each of said tracks opening towards each of said respective axes of said first and second assemblies;

each oscillating member being coupled angularly to two adjacent oscillating members so as to oscillate in phase opposition with respect to said two adjacent oscillating members;

said first and second radii being selected so that each oscillating member is mounted so as to be returned towards a neutral position by a centrifugal force due to rotation of the joint, and so that an inherent frequency, expressed in cycles per unit time, of oscillation of each oscillating member under the return of the centrifugal force at a given speed is substantially equal to twice said given speed expressed as a number of revolutions during the said unit of time.

* * * * *